(12) United States Patent
Ueda et al.

(10) Patent No.: US 7,771,791 B2
(45) Date of Patent: Aug. 10, 2010

(54) PRODUCTION PROCESS OF STRUCTURED MATERIAL

(75) Inventors: Miki Ueda, Tokyo (JP); Shigeru Ichihara, Tokyo (JP); Toru Den, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1016 days.

(21) Appl. No.: 11/468,009

(22) Filed: Aug. 29, 2006

(65) Prior Publication Data

US 2007/0054421 A1      Mar. 8, 2007

(30) Foreign Application Priority Data

Sep. 6, 2005   (JP) .............................. 2005-258565

(51) Int. Cl.
  *H01L 21/00*   (2006.01)
(52) U.S. Cl. ....................................... 427/258
(58) Field of Classification Search ................. 427/258, 427/261

See application file for complete search history.

(56) References Cited

U.S. PATENT DOCUMENTS

| | | | |
|---|---|---|---|
| 6,717,777 B2 | 4/2004 | Den et al. | 360/324 |
| 6,841,224 B2 | 1/2005 | Kamata et al. | 428/164 |
| 6,852,431 B2 | 2/2005 | Fukutani et al. | 428/694 |
| 7,070,855 B2 | 7/2006 | Fukutani et al. | 428/312.2 |
| 7,074,480 B2 | 7/2006 | Fukutani et al. | 428/312.2 |
| 7,081,303 B2 | 7/2006 | Yasui et al. | 428/446 |
| 7,167,342 B2 | 1/2007 | Yasui et al. | 360/135 |
| 2003/0072971 A1* | 4/2003 | Fukutani et al. | 428/694 IS |
| 2004/0048092 A1* | 3/2004 | Yasui et al. | 428/642 |
| 2004/0196592 A1 | 10/2004 | Yasui et al. | 360/135 |
| 2006/0086691 A1 | 4/2006 | Fukutani et al. | 216/56 |
| 2006/0192309 A1 | 8/2006 | Fukutani et al. | 264/1.21 |
| 2006/0222903 A1 | 10/2006 | Ichihara et al. | 428/827 |

FOREIGN PATENT DOCUMENTS

| | | |
|---|---|---|
| JP | 03-094117 | 4/1991 |
| JP | 05-205257 | 8/1993 |
| JP | 11-200090 | 7/1999 |
| JP | 11-224422 | 8/1999 |
| JP | 2002-359138 | 12/2002 |
| JP | 2003-196815 | 7/2003 |
| JP | 2003-217112 | 7/2003 |
| JP | 2004-237431 | 8/2004 |
| JP | 2004-310851 | 11/2004 |

OTHER PUBLICATIONS

S.E. Lambert, et al., "Reduction of Edge Noise in Thin Film Metal Media Using Discrete Tracks", IEEE Transactions and Magnetics, vol. 25, No. 5, Sep. 1989.

* cited by examiner

*Primary Examiner*—Michael Cleveland
*Assistant Examiner*—Tabassom Tadayyon Eslami
(74) *Attorney, Agent, or Firm*—Fitzpatrick, Cella, Harper & Scinto

(57) ABSTRACT

Disclosed herein is a process for producing a structured material, comprising the steps of forming a film on a substrate, forming a plurality of holes in a first region of the film, forming a plurality of holes composed of a hole wall member different from a hole wall member of the holes contained in the first region in a second region other than the first region, filling the holes in the first and second regions with the same material, and modifying the material in at least one region of the first and second regions by a heat treatment.

6 Claims, 5 Drawing Sheets

PRODUCTION PROCESS OF STRUCTURED MATERIAL

BACKGROUND OF THE INVENTION

1. Field of the Invention

The present invention relates to a production process of a structured material having regions different in property. This structured material can be applied to functional devices such as magnetic recording media in particular.

2. Description of the Related Art

Concerning functional devices, there are devices different in property, for example, magnetic property, conductivity, light emitting property, dielectric constant or the like, for every region, such as discrete magnetic recording media, various kinds of wide area sensors, bio sensors and various kinds of composite sensors.

Description is given below taking a magnetic recording medium as an example. With rapidly increasing of information quantities in recent years, it is necessary to improve not only a linear recording density, but also a track recording density in a magnetic recording medium such as a hard disk (HDD) for the purpose of improving a surface recording density. However, when a track width is narrowed for raising the track recording density, seeping out at track ends by a magnetic field spatially diverging out of the tip of a magnetic head and magnetic interference (crosstalk) between adjoining recording tracks occur. The track width is thereby varies. As a result, deterioration of reproduced signals by increase of medium noise becomes a problem.

In order to solve such a problem, there has been proposed a discrete track medium in which recording tracks, which become recording regions, are magnetically separated ("IEEE Transactions on Magnetics", Vol. 25, No. 5, p. 3381-3383, 1989). The discrete track medium is expected to permit high-density recording because crosstalk between tracks is effectively inhibited even when an interval between the tracks is sufficiently narrowed. This discrete track medium has the merit that a magnetic head can be exactly accessed to an intended magnetic track.

There have also been proposed production processes of discrete track media of various types. As a process accompanied by no microprocessing for the surface of a medium, there have been proposed processes comprising chemically modifying magnetic layers of regions to be regions between tracks to make them non-magnetic. There have been proposed, for example, a process comprising implanting a nitrogen ion into magnetic layers to make them non-magnetic (Japanese Patent Application Laid-Open No. H05-205257), a process comprising halogenating magnetic layers to make them non-magnetic (Japanese Patent Application Laid-Open No. 2002-359138) and techniques such as local annealing by laser irradiation (Japanese Patent Application Laid-Open No. H05-205257 and Japanese Patent Application Laid-Open No. 2002-359138).

According to the processes disclosed in Japanese Patent Application Laid-Open No. H05-205257 and Japanese Patent Application Laid-Open No. 2002-359138, a discrete track medium having properties different for every region can be fabricated. However, these processes may have required a large-scale apparatus and a long time in some cases.

It is thus an object of the present invention to provide a process for producing a structured material having properties different for every region by a simpler method.

SUMMARY OF THE INVENTION

According to the present invention, there is provided a process for producing a structured material, comprising the steps of: forming a film on a substrate, forming a plurality of holes in a first region of the film, forming holes composed of a hole wall member different from a hole wall member of the holes contained in the first region in a second region other than the first region, filling the holes in the first and second regions with the same material, and modifying the material in at least one region of the first and second regions by a heat treatment.

According to the present invention, there is also provided a process for producing a structured material, comprising the steps of: providing a member having a first matrix region containing a first material and a second matrix region containing a second material different from the first material, filling holes contained in the respective regions of the member with the same material, and causing the physical properties of the material in the first matrix region to differ from the physical properties of the material in the second matrix region.

According to the present invention, there can be simply produced structured materials having properties different for every region.

Further features of the present invention will become apparent from the following description of exemplary embodiments with reference to the attached drawings.

DESCRIPTION OF THE EMBODIMENTS

The embodiments of the present invention will hereinafter be described in detail with reference to the drawings.

Figure 1A:
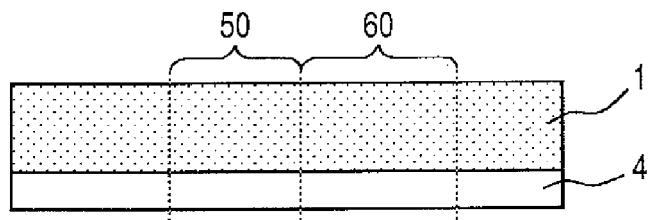
FIGS. 1A, 1B, 1C, 1D, 1E and 1F are flow charts illustrating a production process of a structured material according to an embodiment of the present invention.
Figure 1B:
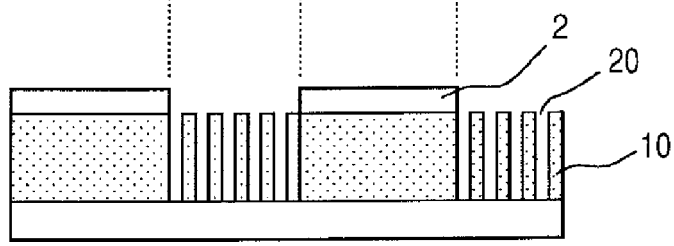
Figure 1C:
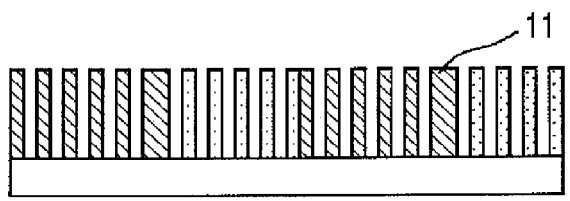

FIGS. 1A, 1B, 1C, 1D, 1E and 1F are flow charts illustrating a production process of a structured material according to an embodiment of the present invention. In the production process of the structured material, a film 1 composed of a metal or semiconductor is first formed on a substrate 4 as illustrated in FIG. 1A, and a plurality of holes 20 are then formed in a first region 50 of the substrate (FIG. 1B). A second region 60 having a plurality of holes 20 composed of a hole wall member 11 different from a hole wall material 10 of the first region 50 is then formed in a region different from the first region 50 on the substrate (FIG. 1C).

The hole in the present invention means a so-called depressed structure and includes those of various forms such as a columnar form and a groove form. The hole does not always need to be a through-hole. "The different hole wall members" in the present invention are preferably those at least the surfaces of which are composed of different materials from each other.

For example, holes composed of the same hole wall member are first formed in the whole of the substrate, and the first or second region is subjected to a surface treatment such as formation of an oxide film, whereby the structured material (FIG. 1C) having different hole wall members can be produced. At this time, a plurality of holes may be formed by wet etching, dry etching, anodic oxidation or the like. Examples of a method for forming the oxide film include a surface treatment with an acid and a heat treatment in an oxygen atmosphere.

Figure 1D:
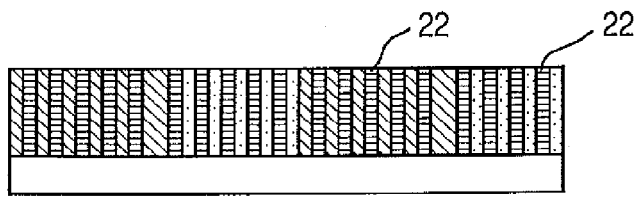
Figure 1E:
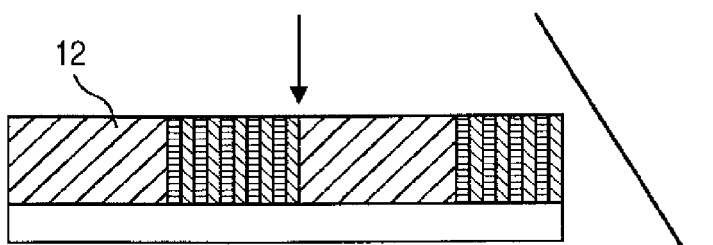

A filling material 22 composed of the same functional material is put into the holes 20 of the structured material having different hole wall members in the first and second regions (FIG. 1D). A reaction is induced between the hole wall member of the first or second region and the filling material, thereby obtaining a structured material (FIG. 1E or 1F) different in properties, for example, magnetic property, conductivity, light emitting property, dielectric constant or the like, for every region. At this time, a case where the second region becomes a uniform film 12 (FIG. 1E) or a case where the second region has cylinders 13 (FIG. 1F) may be selected according to the degree of reaction and diffusion induced between the filling material and the hole wall member. However, the term "uniform film" as used herein means a film having no cylinder structure, and the uniform film may contain a particulate structure or the like. Examples of a method for filling the holes with the functional material include a vapor deposition method, a CVD method, a sputtering method, a plating method and a method of pouring a solution. When the film is formed on the substrate, an electrically conductive layer may be provided between the film and the substrate.

The structured material having a plurality of holes in the first region (or the whole surface) includes that obtained by a method of conducting anodic oxidation of aluminum after covering the second region with a mask. The structured material is also obtained by a method in which the second region composed of silicon or silicon germanium arranged so as to surround side walls of columnar aluminum portions is covered with a mask, and then micro-holes are formed in the first region. Incidentally, the former may also be referred to as an aluminum silicon (AlSi) structure, and the latter an aluminum silicon germanium structure. The details thereof will hereinafter be described with reference to FIGS. 2A, 1B, 1C, 1D, 1E and 2F.

Figure 2A:
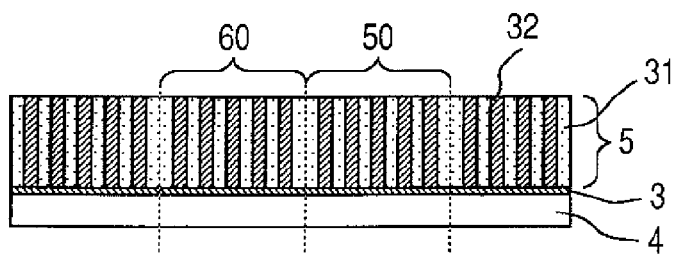
FIGS. 2A, 2B, 2C, 2D, 2E and 2F are flow charts illustrating a production process of a structured material according to another embodiment of the present invention.
Figure 4A:
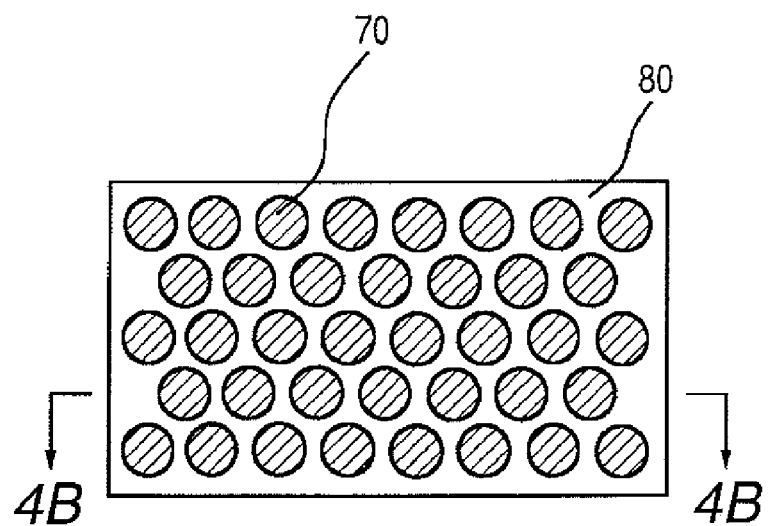
FIGS. 4A and 4B typically illustrate an aluminum silicon film.
Figure 4B:
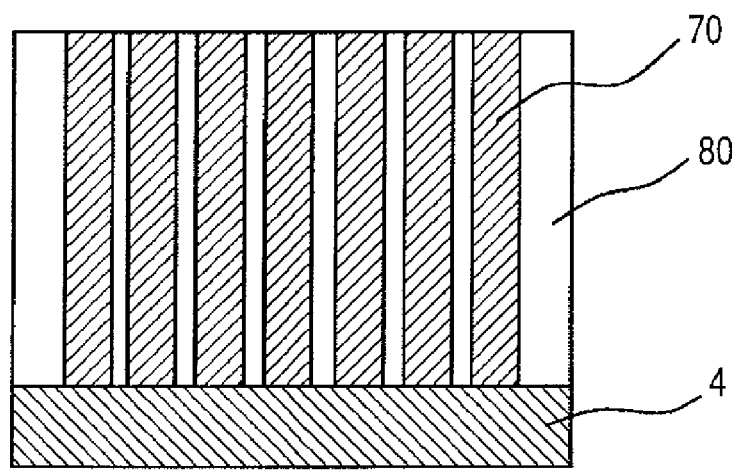

Columnar aluminum portions 32 which are arranged in a vertical direction of a substrate on which an electrically conductive layer 3 has been provided and comprises aluminum as a component are first provided on the substrate. At this time, it is preferable that a silicon matrix 31 containing silicon or silicon germanium is arranged so as to surround the side surfaces of the columnar aluminum portions. An aluminum silicon film 5 of such a structure is provided (FIG. 2A). This aluminum silicon film is typically illustrated in FIGS. 4A and 4B. FIG. 4A is a plan view, and FIG. 4B is a cross-sectional view taken along line 4B-4B in FIG. 4A. This film has a film structure comprised of columnar aluminum portions 70 and a silicon matrix 80 containing silicon or silicon germanium arranged so as to surround the side surfaces of the columnar aluminum portions. Specific examples of this film structure are described in Japanese Patent Application Laid-Open No. 2004-237431. Silicon is taken as an example below. However, the same shall be applicable to silicon germanium.

Description is first given with reference to FIG. 2A. The columnar aluminum portions 32 and the matrix 31 are arranged, as a film 5, on the substrate 4 on which the electrically conductive layer 3 has been formed. The matrix is arranged so as to surround the side surfaces of the columnar aluminum portions. The matrix 31 contains silicon or silicon germanium. In this embodiment, the film is characterized by a structure in which the columnar aluminum portions straightly stand in a vertical direction of the substrate, and silicon is arranged as a matrix of the structured material so as to surround the side surfaces of the columns. Incidentally, silicon may be slightly mixed in the aluminum portions, while aluminum may be slightly mixed in the silicon matrix. In order to form this structured material, it is also preferable to conduct simultaneous film formation in a non-equilibrium state between aluminum and silicon.

The second region is then covered with a mask 2 such as a resist, and the substrate is dipped in an acid or alkali so as to dissolve the columnar aluminum portions 32, thereby dissolving and removing only the columnar aluminum portions 32. For doing so, a plurality of acids or alkalis such as phosphoric acid, sulfuric acid and aqueous ammonia are used. The columnar aluminum portions may also be removed by anodic oxidation. In this embodiment, the condition that the hole wall member of the first region contains silicon oxide is selected. The hole wall member containing silicon oxide is also obtained by annealing of the silicon wall region in an oxygen atmosphere.

Figure 2B:
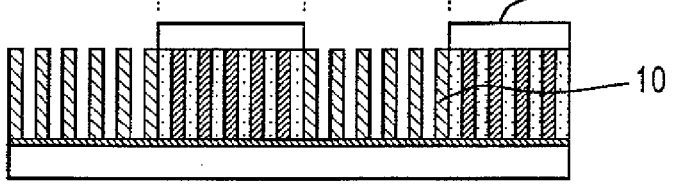

A structured material in which only the first region has a plurality of holes and the hole wall member 10 is composed of silicon oxide is thereby obtained (FIG. 2B).

The mask 2 on the second region in the structured material is then removed, and the structured material is dipped in 98% concentrated sulfuric acid, whereby aluminum can be etched to form a plurality of holes having a second hole wall member 11 composed of silicon in the second region 60. In order to protect the electrically conductive layer, the structured material is fully washed with running water immediately after the etching of aluminum.

Figure 2C:
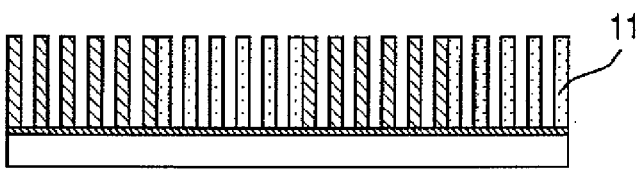

A structured material in which the hole wall member 10 of the holes contained in the first region 50 is silicon oxide and the hole wall member 11 of the holes contained in the second region 60 is silicon is thereby obtained (FIG. 2C). In this aluminum silicon structured material from which aluminum has been removed, the diameter of each hole falls within a range of from 1 to 15 nm and the interval between the holes falls within a range of from 3 to 20 nm, though they vary depending on the composition thereof.

Figure 2D:
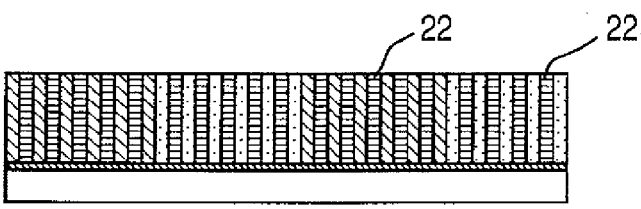

A magnetic substance is then put into the structured material illustrated in FIG. 2C by means of an electrode position method using the electrically conductive layer 3 located at the bottoms of the respective holes as an electrode (FIG. 2D). In particular, a magnetic metal such as Fe, Co or Ni and a noble metal such as Pt or Pd are deposited at the same time, whereby a magnetic substance having an L10 or L12 ordered structure typified by FePt or CoPt can be filled. Filling can be performed with a Co alloy having an hcp structure or a magnetic substance comprising Ni or Fe as a main component and having an fcc structure.

Figure 2E:
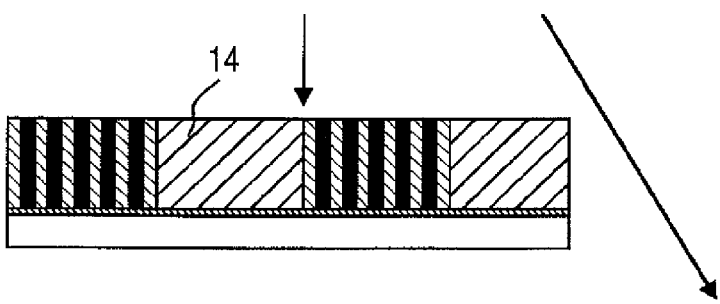

For example, the structured material illustrated in FIG. 2C is filled with FePt. Thereafter, the structured material is subjected to an annealing treatment at 550° C. or higher. In such a manner, the cylinder members in the first region are converted to an L10 FePt ordered alloy. In the second region, Fe and Pt react with silicon of the hole wall member 11 to form a film 14 having no cylinder structure and containing Fe silicide and Pt silicide (FIG. 2E).

Figure 2F:

When the annealing temperature is 450° C., the cylinder members in the first region are converted to an L10 FePt ordered alloy, but in the second region, FePtSi having a random phase is produced to form a cylinder structure having a form different from that before the annealing treatment (FIG. 2F).

When the structured material illustrated in FIG. 2C is filled with Co, and annealing is conducted at 400° C., the cylinder members in the first region become Co having the hcp structure, and the second region becomes a non-magnetic region composed of a uniform film containing Co silicide.

The temperature for forming a silicide varies according to the element and is 450 to 500° C. for Fe, 200 to 500° C. for Pt, 350 to 550° C. for Co, 450° C. for Cr, or 100 to 850° C. for Pd. In the second region, the material of the cylinder members and silicon of the silicon matrix are alloyed by the annealing treatment. In this case, the resulting alloy and the form of the cylinder members may be selected according to the temperature of the annealing treatment. When annealing is conducted at a high temperature, the cylinder members may also be lost to make the second region uniform.

In the present invention, filling with the same material is conducted and the heat treatment is collectively conducted as described above, whereby regions different in properties can be selectively formed according to the materials of the hole wall members. When this process is applied to, for example, the fabrication of a magnetic recording medium, and filling with FePt is conducted, the region whose hole wall member is silicon oxide becomes an L10 FePt ordered alloy after the heat treatment, and this region contributes as a recording portion. The region whose hole wall member is silicon becomes non-magnetic or soft-magnetic and contributes as a non-recording portion, whereby a discrete track medium or patterned medium can be provided.

Figure 5:
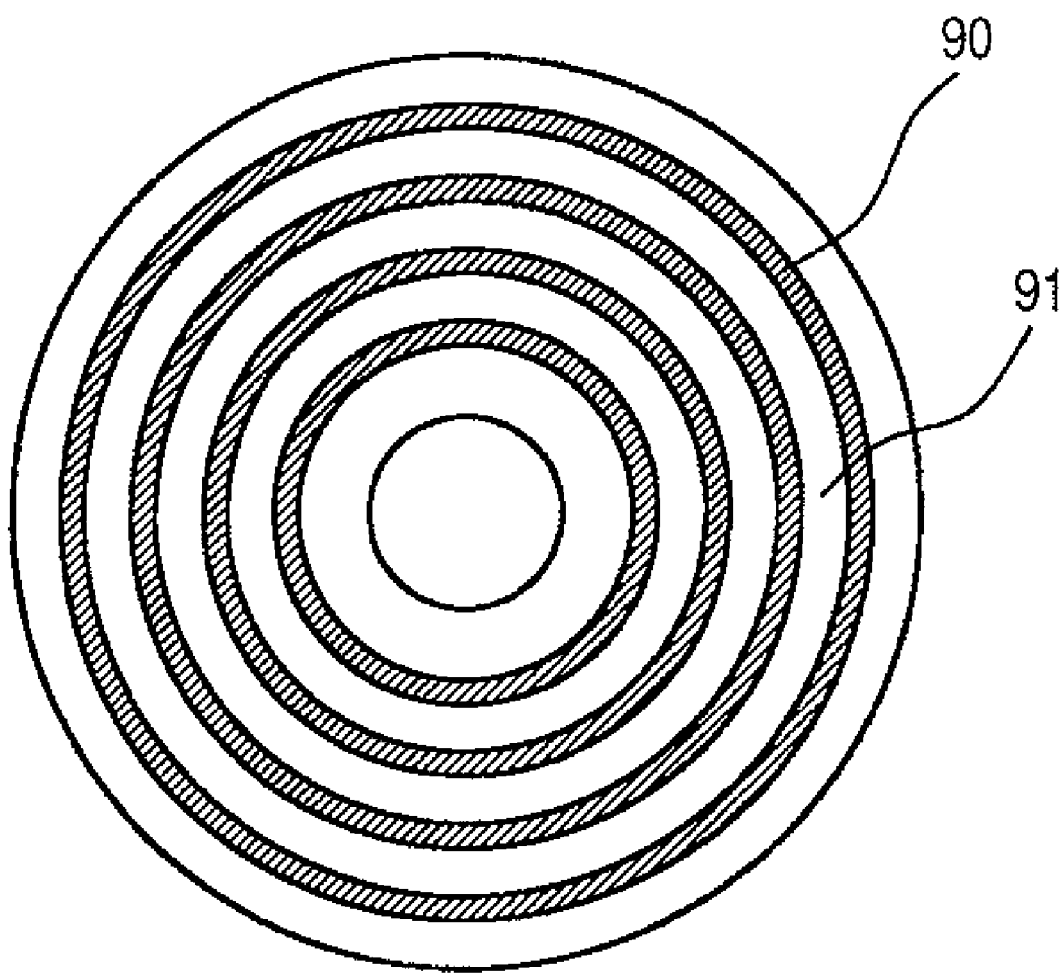
FIG. 5 typically illustrates a discrete medium.

FIG. 5 typically illustrates a discrete medium. According to the present invention, for example, there can be fabricated a discrete track medium in which a first region having hard magnetism is a magnetic recording region 90, and a second region having non-magnetism or soft magnetism is a non-recording region 91, as illustrated in FIG. 5. In FIG. 5, the discrete medium is typically illustrated, and an actual track width is 200 nm or smaller, preferably 100 nm or smaller.

A structured material having micro-holes (alumina nano-holes) obtained by anodic oxidation of aluminum will now be described with reference to FIGS. 1A, 1B, 1C, 1D, 1E and 1F.

An aluminum film is formed as a film 1 on a substrate 4 on which an electrically conductive layer has been formed (FIG. 1A). However, the electrically conductive layer between the substrate and the film is not illustrated.

A mask 2 is formed on a second region 60 to subject a first region 50 to anodic oxidation (FIG. 1B). At this time, the substrate is dipped in an aqueous solution of phosphoric acid, oxalic acid, sulfuric acid or the like, and the first region is used as an anode to apply a voltage, thereby forming micro-holes in a self-organizing manner. The interval between the micro-holes formed at this time is determined by the voltage applied, and the relation of 2.5×Voltage [V] (nm) is known. Alumina nano-holes having a hole diameter of about 10 to 100 nm are obtained.

In the formation of the alumina nano-holes, the formation of ordered depressions in the surface of the aluminum film brings forth such a feature that ordered micro-holes can be formed in the form of a honeycomb or square with the depressions as the points of origin. Specific examples of the micro-holes obtained by anodic oxidation of aluminum are described in Japanese Patent Application Laid-Open No. H11-200090.

After the mask 2 is removed, holes whose hole wall member is aluminum are then formed in the second region 60 by a dry process or the like, thereby obtaining a structured material in which the hole wall member 10 of the holes contained in the first region is aluminum oxide, and the hole wall member 11 of the holes contained in the second region is aluminum (FIG. 1C)

Figure 1F:
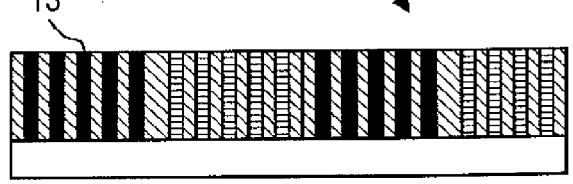

The structured material illustrated in FIG. 1C is filled with a filling material 22 by means of a dry process, for example, sputtering, vapor deposition or CVD (FIG. 1D). For example, when filling with Co is conducted and annealing is conducted at 350° C., the cylinder members in the first region become Co having an hcp structure, and the second region becomes a non-magnetic region having a cylinder structure containing an alloy of Co and aluminum (FIG. 1F).

Further, structured material having nano-holes are provided and various kinds of functional materials are put into them, thereby fabricating functional devices. When a magnetic recording material is used as a functional material, a recording device is obtained. A conductive material such as a metal is applied, an electronic device such as a quantum dot, quantum wire, quantum wire transistor, single electron transistor or single electron memory, as well as a conductive member such as an electrode, are obtained. When filling with a light emitting material is conducted, a light emitting device is obtained. It goes without saying that plural kinds of materials may also be used upon the filling.

Examples of a method for filling the holes with the functional material include a vapor deposition method, a CVD method, a sputtering method, a plating method and a method of pouring a solution. In particular, as an electroplating method, pulsed plating in which a potential is controlled, and the time for applying a potential is controlled as needed may also be used in addition to ordinary electroplating in which a constant potential is continuously applied. Since the pulsed plating permits facilitating a nucleus generating density upon plating, it effectively acts for plating into the micro-holes.

Another embodiment of the present invention is a production process of a structured material, comprising the following first to third steps.

The first step is a step of providing a member having a first matrix region containing a first material and a second matrix region containing a second material different from the first material.

The second step is a step of filling holes (or depressed portions or grooves) contained in the respective regions of the member with the same material.

The third step is a step of causing the physical properties of the material in the first matrix region differ from the physical properties of the material in the second matrix region.

Incidentally, the physical properties in the third step means, for example, magnetic properties (coercive force, saturation magnetization, and magnetic or non-magnetic), electric conductivity, resistance, electronic conductivity or stiffness. Therefore, a method for causing a chemical reaction between a matrix region and the material or selectively modifying the material put into one matrix region may be applied in addition to the heat treatment. Incidentally, the modification in the present invention includes not only chemical change such as oxidation or silicification, but also phase change.

EXAMPLES

The present invention will hereinafter be described more specifically by the following EXAMPLES. Incidentally, cases where filling with FePt is conducted for a substrate mainly using aluminum and silicon by a plating method are described in EXAMPLES, but the present invention is not limited to these materials and the filling method.

Example 1

This example relates to a structured material illustrated in FIGS. 2A, 2B and 2C. More specifically, a titanium film having a thickness of 5 nm and a tungsten film having a thickness of 100 nm as an electrically conductive layer were formed on a silicon disk 4 by a sputtering method. Thereafter, an $Al_{56}Si_{44}$ film 5 having a thickness of 50 nm was further provided by sputtering (FIG. 2A). Incidentally, there is no need to be limited to this composition so far as it satisfies $Al_ySi_xGe_{1-x}$ (0<x<1, 0.25<y<4).

A mask pattern was formed on this aluminum silicon film in accordance with a general semiconductor process using a photoresist having high alkali resistance to cover a second region 60 with a mask 2. This structured material was dipped for 10 minutes in 3% aqueous ammonia, thereby forming a film having a plurality holes in a first region 50 (FIG. 2B). After the mask was removed, the substrate was then dipped in 98% concentrated sulfuric acid to etch aluminum in the second region, and the substrate was then immediately washed with running water. By the above-described process, a porous body (FIG. 2C), in which a first hole wall member 10 was composed of silicon oxide, and a second hole wall member 11 was composed of silicon, was obtained.

Example 2

Figure 3A:
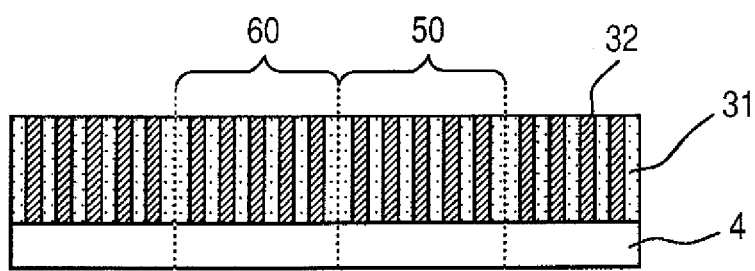
FIGS. 3A, 3B and 3C are flow charts illustrating a production process of a structured material according to a further embodiment of the present invention.
Figure 3B:
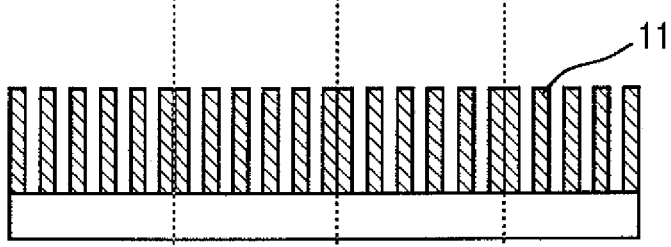
Figure 3C:
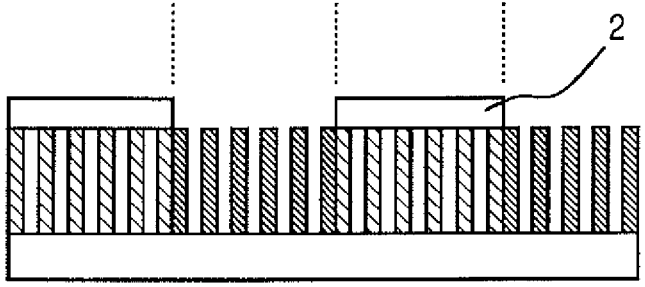

This example relates to a structured material illustrated in FIGS. 3A, 3B and 3C. More specifically, an $Al_{56}Si_{44}$ film (there is no need to be limited to this composition so far as it satisfies $Al_ySi_xGe_{1-x}$ (0<x<1, 0.25<y<4)) having a thickness of 50 nm was provided on a silicon disk 4 by film forming by a sputtering method (FIG. 3A). After this disk was dipped in 98% concentrated sulfuric acid to complete etching of aluminum, the disk was immediately washed with running water. By this process, a porous body, in which the hole wall member of the whole of the film was composed of silicon, was provided (FIG. 3B). Thereafter, a mask pattern was formed on the porous body in accordance with a general semiconductor process using a photoresist having high alkali resistance to cover a first region 50 with a mask 2. This porous body was dipped in 0.3 M phosphoric acid to modify the hole wall member 11 in the second region to silicon oxide. By the above-described process, a porous body, in which the hole wall member in the first region was silicon and the hole wall member in the second region contained silicon oxide, was obtained (FIG. 3C).

Example 3

This example relates to a fabrication process of a discrete medium. An $Al_{56}Si_{44}$ film (there is no need to be limited to this composition so far as it satisfies $Al_ySi_xGe_{1-x}$ (0<x<1, 0.25<y<4)) was provided as a film 5 illustrated in FIG. 2A on a silicon disk. A mask pattern was formed in second regions 60 concentrically and circularly arranged with a width of 100 nm on this aluminum silicon film in accordance with a general semiconductor process using a photoresist that is a photosensitive material having high alkali resistance. This disk substrate was dipped in 3% aqueous ammonia, thereby producing a porous body, in which the hole wall member of the first region was composed of silicon oxide (FIG. 2B).

After the mask was removed, the substrate was dipped in 98% concentrated sulfuric acid to obtain a porous body, in which the hole wall member of the second regions was silicon. After the etching of aluminum in the second regions was completed, the resultant porous body was immediately washed with running water. By this process, a porous body, in which the hole wall members differed with regions, was obtained (FIG. 2C). This porous body was subjected to pulsed plating with a plating solution containing 0.5 M $FeSO_4$, 0.02 M $FeCl_2$ and 5 mM $H_2PtCl_6$, thereby filling the holes with FePt. The thus-obtained structured material was polished (FIG. 2D) and annealed at a temperature of 550° C. or higher, whereby FePt in the first regions was converted to an L10 ordered alloy, and a uniform film of FePtSi was formed in the second regions (FIG. 2E).

According to this example, a discrete track medium, in which magnetic recording regions 90 are composed of the first regions 50 and non-recording regions 91 are composed of the second regions 60, can be fabricated by conducting the heat treatment once.

Example 4

This example relates to a fabrication process of a discrete medium. A structured material in which a porous body was filled with FePt was produced in the same manner as in EXAMPLE 3. The structured material was polished (FIG. 2D) and annealed at 450° C., whereby FePt in the first regions was converted to an L10 ordered alloy, and a film having a cylinder structure composed of FePtSi was formed in the second regions (FIG. 2F).

According to this example, a discrete track medium, in which magnetic recording regions 90 are composed of the first regions 50 and non-recording regions 91 are composed of the second regions 60, can be fabricated by conducting the heat treatment once.

According to the present invention, structured materials different in properties for every region can be provided by filling the first and second regions having a plurality of holes the hole wall members of which are different with the same material and conducting the heat treatment once. Such structured materials can be applied to magnetic recording media and discrete track media.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority benefits of Japanese Patent Application No. 2005-258565 filed Sep. 6, 2005, the entire disclosure of which is incorporated herein by reference in its entirety.

What is claimed is:

1. A process for producing a structured material, comprising the steps of:
   forming a film on a substrate,
   forming a plurality of holes in a first region of the film,
   forming holes composed of a hole wall member different from a hole wall member of the holes contained in the first region in a second region other than the first region, wherein the hole wall member in the second region is composed of a different substance than the hole wall member in the first region,
   filling the holes in the first and second regions with the same material, and modifying the material in at least one region of the first and second regions by a heat treatment.

2. The process according to claim 1, wherein one of the first and second hole wall members reacts with the material in the holes in the first and second regions by the heat treatment to modify the material in one of the first and second regions to a first functional material and the material in the other to a second functional material different from the first functional material.

3. The process according to claim 1, which comprises the steps of forming the film comprised of cylinder members containing aluminum and a matrix member comprising silicon or silicon germanium as a component surrounding the side surfaces of the cylinder members on the substrate, masking the first region of the film to remove the aluminum-containing cylinder members contained in the second region other than the first region with an acid other than concentrated sulfuric acid and an alkaline aqueous solution to form a plurality of holes in the second region, and removing the mask and removing the aluminum-containing cylinder members in the first region with sulfuric acid to form a plurality of holes in the first region.

4. The process according to claim 1, which comprises the steps of forming holes wherein the hole wall member in the first region is composed of silicon oxide and the hole wall member in the second region is composed of silicon, filling the holes of the first and second regions with any one of CoPt, FePt and NiPt, and conducting a heat treatment to form in the first region cylinder members composed of an L10 or L12 ordered alloy containing CoPt, FePt or NiPt and to form in the second region cylinder members composed of a material containing any one of CoPtSi, FePtSi and NiPtSi produced by a reaction of the hole wall member with the material in the holes in the second region.

5. The process according to claim 1, which comprises the steps of forming holes wherein the hole wall member in the first region is composed of silicon oxide and the hole wall member in the second region is composed of silicon, filling the holes of the first and second regions with CoPt, FePt or NiPt, and conducting a heat treatment to form in the first region cylinder members composed of an L10 or L12 ordered alloy containing CoPt, FePt or NiPt and to form in the second region a continuous film containing CoPtSi, FePtSi or NiPtSi produced by a reaction of the hole wall member with the material in the holes in the second region.

6. A process for producing a structured material, comprising the steps of: providing a member having a first matrix region containing a first material and a second matrix region containing a second material different from the first material, wherein the second matrix region is composed of a different substance than the first matrix region, filling holes contained in the respective regions of the member with the same material, and causing the physical properties of the material in the first matrix region to differ from the physical properties of the material filled in second matrix region.

* * * * *